United States Patent Office 2,945,902
Patented July 19, 1960

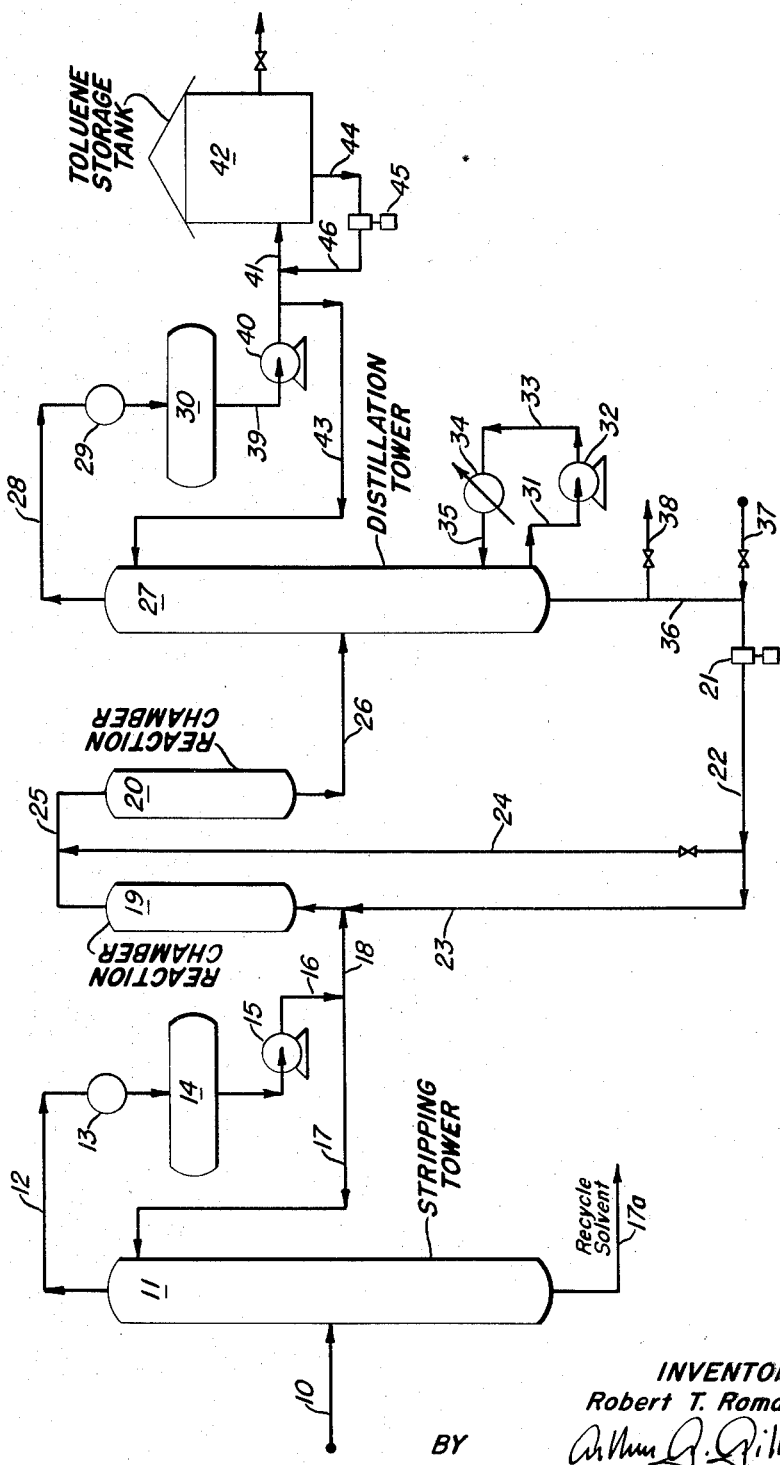

2,945,902

METHOD OF IMPROVING THE COLOR OF AN AROMATIC HYDROCARBON OBTAINED FROM A HYDROFORMATE EXTRACT BY TREATMENT WITH MALEIC ANHYDRIDE

Robert T. Romans, Texas City, Tex., assignor to The American Oil Company, Texas City, Tex., a corporation of Texas Filed Apr. 23, 1956, Ser. No. 579,996

3 Claims. (Cl. 260—674)

My invention relates to the production of aromatics, particularly toluene but also benzene, as high purity chemical products from petroleum. More particularly, it is concerned with refining the aromatic chemical to improve color and color stability.

In the production of chemical grade aromatics from petroleum according to conventional practice, a selected naphtha fraction is subjected to catalytic hydroforming. The hydroformate is fractionated to segregate the toluene or benzene cut, as the case may be, which is then treated with a selective solvent to separate the pure aromatic from associated close boiling non-aromatic hydrocarbons by means of extrative distillation or solvent extraction. In order to meet nitration grade specifications, the aromatic must be subjected to treatment with strong sulfuric acid. For example, the acid treating may require 5 to 10 pounds or more of 87 to 98% $H_2SO_4$ per barrel of aromatic. The aromatic is then separated from acid sludge, neutralized with caustic and is redistilled.

The purpose of the acid treating procedure is to improve the acid wash color of the product in order to meet ASTM specifications for nitration and industrial grade aromatics. In the case of nitration grade toluene (ASTM D–842–50), it is essential to remove small amounts of contaminants, particularly olefinic hydrocarbons, which are highly undesirable in TNT manufacture. The impurities are readily indicated by the so-called "acid wash test," ASTM D–848–47, according to which a sample of the toluene is treated with sulfuric acid and the amount of color development is noted. The color obtained in this way is known as the "acid wash color." The test consists in shaking a small sample of toluene with 96% $H_2SO_4$ and noting the color of the acid in comparison with certain color standards.

In U.S. Patent 2,380,561 to Wadsworth, the use of very small proportions of maleic anhydride (or acid), generally within the range of 0.001% to 0.01%, is described for treating acid refined toluene. As described in the patent, it had been found in many instances that in refining petroleum toluene difficulty was encountered with acid wash color instability. Acid wash stability may be tested by the wartime Baytown Ordnance Works stability test. The test is conducted as follows: A 600 ml. sample of toluene is placed in a three-necked round bottom 1000 ml. Pyrex flask. The flask is connected thru a ground joint to a reflux condenser and placed on a boiling water bath. A slow current of air is led into the flask, the air having been purified by passing thru 98% sulfuric acid, solid potassium hydroxide and then thru Drierite. Before entering the flask the air passes thru eight feet of copper tubing submerged in the boiling water bath. Samples of toluene are withdrawn from the flask at intervals up to twenty-four hours or until the acid wash color of the sample reaches 6+. If the sample does not become darker than 6 color in 20 hours, the toluene stability is considered satisfactory. When small amounts of maleic anhydride or maleic acid are used as a supplement to the usual sulfuric acid treat, satisfactory stabilization of the acid wash color is obtained. Also, in many instances, the acid requirements are materially reduced with attendant economic advantages.

As pointed out in the Wadsworth patent, increasing the amount of maleic anhydride used in treating acid refined toluene, even to the extent of doubling the amount used, appeared to offer little or no advantage. Surprisingly, it has now been found that if substantially larger amounts of maleic anhydride are used in treating the petroleum toluene extract than those of the patent, the need for the conventional sulfuric acid wash can be eliminated entirely. The initial color of of the product and the acid wash color stability are also improved. This is surprising, and difficult to explain, because the small amounts formerly used are more than sufficient stoichiometrically, to react with any olefinic contaminants present in the crude toluene. The use of larger amounts of maleic anhydride, however, is impracticable following conventional practice in which the maleic anhydride is simply added to a stream of the acid refined product passing to a reaction zone and thence to caustic washing. Since the caustic destroys the excess maleic anhydride contained in the product, it is difficult to justify the use of more than the minimum quantity necessary, particularly since facilities for recovering maleic anhydride by a physical separation prior to caustic washing would add an excessive economic burden to the process.

According to the present invention, the petroleum aromatic extract, e.g., toluene, is contacted without sulfuric acid treatment by a circulating stream comprising a relatively concentrated solution of maleic anhydride in the aromatic. The contact solution of maleic anhydride is obtained by distilling the contact mixture after the contacting operation so as to take overhead the refined aromatic and take as bottoms the concentrated solution of maleic anhydride-in-aromatic. The distilled aromatic can be treated in the usual fashion with a caustic or water wash, but rerunning is unnecessary. In this way, the use of higher concentrations of maleic anhydride, i.e., above about 0.2 wt. percent, is facilitated. The need for conventional sulfuric acid treating is eliminated with attendant savings in capital investment and operating cost. The yield of specification grade product is increased by eliminating sulfonation losses. No additional capital equipment for distillation or washing is required.

The operation of the invention will be more specifically described by reference to the simplified flow diagram of the accompanying drawing.

In the drawing, a rich solvent stream containing extract toluene is charged through line 10 to stripping tower 11. The toluene extract is removed overhead in tower 11 through line 12 and condenser 13 to extract receiver 14. Reflux may be returned to the tower top by means of pump 15 annd lines 16 and 17. Stripped solvent is recovered from the bottom of tower 11 through line 17a for recycle to the solvent extraction operation. The extract product is charged by pump 15 through lines 16 and 18 to one or more reaction chambers, shown as a pair of serially connected chambers 19 and 20. A recirculating concentrate of maleic anhydride in toluene is pumped by pump 21 through line 22 to lines 23 and 24. Thus, a portion of the concentrate from line 23 can be mixed with the extract in line 18 for charging to reaction chamber 19. Another portion of aconcentrate from line 24 can be mixed with the effluent from chamber 19 passing via connection 25 to chamber 20. The design, number and size of chambers make provision for adequate reaction time between the maleic anhydride and unsaturates in the extract in the most economic fashion.

The effluent from chamber 20 is passed by connection 26 to fractionating tower 27. The tower 27 is operated to take overhead the bulk of the toluene through line 28 and condenser 29 to refined extract receiver 30. Heat for the distillation may be provided by pumping toluene solution from the bottom of the tower through line 31 by means of pump 32, line 33 and thence through heat exchanger 34 and connection 35 to tower 27. The higher boiling maleic anhydride (about 200° C.) in toluene solution is withdrawn from the bottom of the tower through line 36 for recirculation via pump 21 to the contacting operation effected in chambers 19 and 20. Make-up maleic anhydride can be added continuously or intermittently through connection 37 while a corresponding slip stream of spent solution is withdrawn from connection 38.

In the operation shown, the maleic refined extract from receiver 30 is passed via line 39, pump 40 and line 41 to tank 42. Reflux to the top of distillation tower 27 may be provided through line 43. As shown, the refined product is caustic washed by circulating a stream of aqueous caustic solution from the bottom of tank 42 through line 44, pump 45 and line 46 for admixture with the material in line 41.

In the operation shown, the extract toluene has been recovered conventionally by the use of a solvent selective for aromatics, e.g. phenol, cresol, furfural, chlorex, ethylene or diethyleneglycol and the like, by extraction from a $C_7$ hydroformate. The hydroformate may be produced by reforming a selected naphtha cut in the presence of hydrogen and a reforming catalyst such as platinum-alumina or molybdenum oxide-alumina under conventional reforming conditions. The maleic refining conditions are subject to considerable flexibility. It is essential that the concentration of the circulating maleic-anhydride-toluene concentrate is sufficient to provide at least about 0.2 wt. percent of maleic anhydride, and preferably about 1 to 2 wt. percent, in the contacting zone. Since maleic anhydride is soluble to the extent of about 23 grams per 100 grams of toluene at 25° C. (about 50 grams per 100 grams of benzene), considerably higher concentrations can be employed, but in general there is no reason for using more than about 5 wt. percent since inventory costs are simply increased. Since maleic acid is practically insoluble in benzene or toluene, it cannot be substituted for maleic anhydride as was done by Wadsworth in his U.S. 2,380,561. Ambient temperatures may be employed, but in order to conserve cooling water requirements, the operation may be conducted as shown in the above example at the temperature resulting from admixing the stream in line 18 which is about 100° F. and the stream in line 22 which is about 250° F. The maleic anhydride reaction in the contacting step proceeds fairly rapidly so that a hold-up time exceeding fifteen minutes is rarely necessary with reasonably efficient contact. It is unnecessary to use more than one contacting stage. In the example described above, distillation tower 27 is operated at an overhead temperature of 240° F. at a pressure of 5 p.s.i.g. The bottoms temperature is 250° F. and contains 5 percent maleic anhydride in toluene. The concentrate is mixed with the crude extract in a volume ratio of 0.04 to 1, providing an average concentration of 0.2 percent maleic anhydride in the contacting zone. The example is directed to refining crude toluene but where nitration or high industrial grade benzene or xylene is desired, the crude extract from extraction of the selected hydroformate cut can be subjected to the same general operation.

I claim:

1. The method of improving both the color and color stability of a mono-nuclear aromatic hydrocarbon obtained as a component of a naphtha hydroformate extract which contains olefinic hydrocarbon contaminants normally present in said extract, which method consists essentially of treating a naphtha hydroformate extract containing said mono-nuclear aromatic hydrocarbon and said olefinic hydrocarbon contaminants in a contacting zone with a hydrocarbon solution of maleic anhydride which contains an amount of maleic anhydride greater than 0.2 weight percent based on total extract hydrocarbons present in the contacting zone, distilling at least a part of said treated naphtha extract to obtain the mono-nuclear aromatic hydrocarbon substantially free of said olefinic contaminants as an overhead hydrocarbon product and a bottoms fraction containing maleic anhydride, mono-nuclear aromatic hydrocarbon and said olefinic hydrocarbon contaminants, removing a part of the bottoms fractions for purging olefinic hydrocarbon contaminants from the system and recycling the remainder of the bottoms fraction as said hydrocarbon solution to the treating step together with sufficient maleic anhydride to provide at least about 0.2 weight percent concentration thereof based on total extract hydrocarbons in said contacting zone.

2. The process of claim 1 in which the mono-nuclear aromatic hydrocarbon is toluene.

3. The process of claim 2 in which the concentration of maleic anhydride in the treating step is about 1 to 2 wt. percent based on total extract hydrocarbons.

References Cited in the file of this patent

UNITED STATES PATENTS 2,431,655    Amos et al. _____ Nov. 25, 1947

FOREIGN PATENTS 352,164    Great Britain _____ July 9, 1931

OTHER REFERENCES

Chemical Abstracts, vol. 44 (1950), columns 2922–2927. Original article in ann. vol. 565, pages 57–72 (1949).